United States Patent Office 2,734,071
Patented Feb. 7, 1956

2,734,071

BIS(HALOCYANOETHYL) TEREPHTHALATES

Etcyl H. Blair, Midland, Mich., assignor to The Dow Chemical Company, Midland, Mich., a corporation of Michigan No Drawing. Application May 19, 1954,
Serial No. 430,992

4 Claims. (Cl. 260—465)

The present invention is concerned with the bis-(halocyanoethyl) terephthalates having the formula

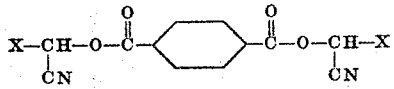

wherein X represents a halomethyl radical. These new ester compounds are crystalline solids somewhat soluble in many common organic solvents and of very low solubility in water. The compounds are particularly useful as bactericides and fungicides and are adapted to be employed as active toxic constituents of compositions for the control of bacterial and fungal organisms such as *Eberthella typhosa* and *Rhizopus nigricans*.

The new terephthalate compounds may be prepared by mixing or otherwise blending together a haloacetaldehyde cyanohydrin and a terephthaloyl dichloride at a reaction temperature at which chloride of reaction is formed from the carbonyl chloride of the terephthaloyl dichloride reactant. This chloride appears in the reaction mixture as hydrogen chloride. The reaction conveniently may be carried out in an inert organic solvent such as toluene, chlorobenzene or dichlorobenzene. Good results are obtained when one molecular proportion of terephthaloyl dichloride is reacted with two or more molecular proportions of the haloacetaldehyde cyanohydrin reagent. The reaction proceeds smoothly with the formation of the desired product and hydrogen halide of reaction at temperatures of from 100° to 210° C. In carrying out the reaction, substantially all of the carbonyl chloride of the terephthaloyl dichloride reactant may be recovered as hydrogen chloride. Upon completion of the reaction, the desired product may be separated by conventional methods, e. g. extraction with an organic solvent, washing with water, washing with dilute aqueous alkali metal carbonate, filtration, decantation and evaporation of any employed reaction solvent.

The following examples illustrate the invention but are not to be construed as limiting:

*Example 1.—Bis(2,2,2-trichloro-1-cyanoethyl) terephthalate*

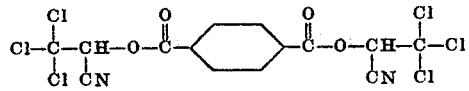

33 grams (0.19 mole) of chloral cyanohydrin was dispersed in 15 grams (0.074 mole) of terephthaloyl dichloride dissolved in 150 milliliters of chlorobenzene and the resulting mixture heated at the boiling temperature and under reflux until about 0.12 mole of hydrogen chloride of reaction had been evolved. The heating was carried out at a temperature of from 130° to 135° C. and over a period of one-half hour. Following the heating period, the reaction mixture was successively washed with hot five percent aqueous sodium carbonate and hot water, and thereafter dried with calcium sulfate. The solvent was then partially removed from the mixture by fractional distillation under reduced pressure. During the distillation, a bis(2,2,2-trichloro-1-cyanoethyl) terephthalate product precipitated in the mixture as a crystalline solid. The latter was separated by filtration, recrystallized from ethanol and found to melt at 163°–165° C.

*Example 2.—Bis(2,2,2-tribromo-1-cyanoethyl) terephthalate*

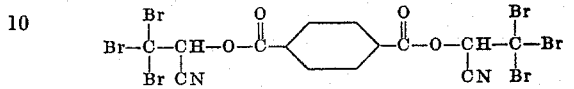

One-half mole of bromal cyanohydrin and one-quarter mole of terephthaloyl dichloride is dissolved in 300 milliliters of chlorobenzene and the resulting mixture heated at the boiling temperature and under reflux until the evolution of hydrogen chloride of reaction is substantially complete. The reaction mixture is then cooled to room temperature and successively washed with water and dilute aqueous sodium carbonate. Following the removal of the solvent by evaporation, a bis(2,2,2-tribromo-1-cyanoethyl) terephthalate product is obtained as a crystalline residue.

*Example 3.—Bis(2-chloro-1-cyanoethyl) terephthalate*

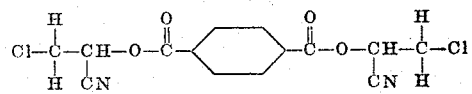

One-half mole of chloroacetaldehyde cyanohydrin and one-fourth mole of terephthaloyl dichloride is dissolved in 275 milliliters of chlorobenzene and the resulting mixture heated at the boiling temperature and under reflux until the evolution of hydrogen chloride of reaction is substantially complete. The reaction mixture is then cooled to room temperature and successively washed with water and dilute aqueous sodium carbonate. Following the removal of the chlorobenzene by fractional distillation under reduced pressure, a bis(2-chloro-1-cyanoethyl) terephthalate product is obtained as a residue.

In a similar manner, other bis(halocyanoethyl) terephthalates may be prepared of which the following are representative.

Bis(2,2-dibromo-1-cyanoethyl) terephthalate by reacting together dibromoacetaldehyde cyanohydrin and terephthaloyl dichloride.

Bis(2,2-dichloro-1-cyanoethyl) terephthalate by reacting together dichloroacetaldehyde cyanohydrin and terephthaloyl dichloride.

Bis(2-bromo-1-cyanoethyl) terephthalate by reacting together bromoacetaldehyde cyanohydrin and terephthaloyl dichloride.

I claim:

1. A bis(halocyanoethyl) terephthalate of the formula

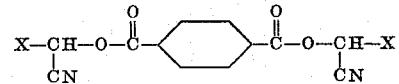

wherein X represents a member of the group consisting of chloromethyl and bromomethyl radicals.

2. Bis(2,2,2-trichloro-1-cyanoethyl) terephthalate.

3. A process for the manufacture of a terephthalate of the formula

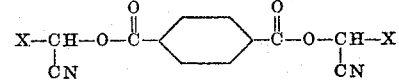

wherein X represents a halomethyl radical which comprises mixing together a haloacetaldehyde cyanohydrin and terephthaloyl dichloride at a temperature at which hydrogen chloride of reaction is formed, the halogen in said halomethyl radical and haloacetaldehyde cyanohydrin being selected from the group consisting of bromine and chlorine.

4. A method for the manufacture of a terephthalate of the formula

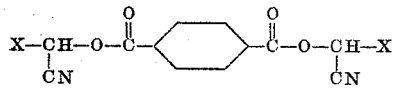

wherein X represents a halomethyl radical which comprises (1) mixing terephthaloyl dichloride with a haloacetaldehyde cyanohydrin and (2) heating said mixture at a temperature of from 100° to 210° C. until the evolution of hydrogen chloride of reaction is substantially complete, the halogen in said halomethyl radical and haloacetaldehyde cyanohydrin being selected from the group consisting of bromine and chlorine.

References Cited in the file of this patent
UNITED STATES PATENTS

| | | |
|---|---|---|
| 2,302,743 | Carruthers et al. | Nov. 24, 1942 |
| 2,628,207 | Smith et al. | Feb. 10, 1953 |